United States Patent Office 3,161,144
Patented Dec. 15, 1964

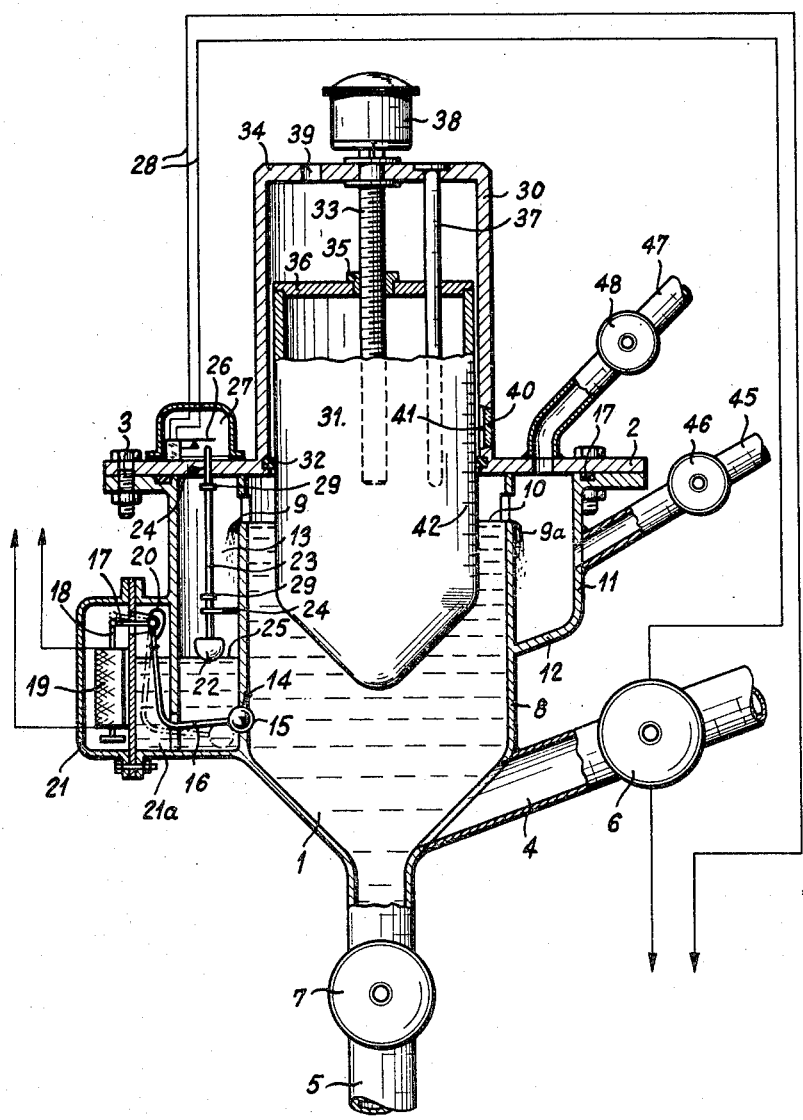

3,161,144
INJECTION DEVICE
Kurt Hugentobler, Onex, Geneva, Switzerland, assignor to Etablissements G. Lesieur & ses Fils, Paris, France, a firm
Filed Apr. 18, 1963, Ser. No. 273,970
Claims priority, application Switzerland, Apr. 19, 1962, 4,819/62
9 Claims. (Cl. 103—248)

This invention relates to an injection device comprising a container for receiving a predetermined quantity of injection material, duct and conduit means respectively for filling the container with injection material, for admitting compressed gas to subject said material to pressure, for discharging said material under pressure and for venting the container after an injection operation, said duct and conduit means having selectively operable valve means.

In known injection devices, a given quantity—the dose—of injection material is introduced into an injection container whereupon the latter is pressurized by means of compressed gas which exercises the necessary pressure for injecting said dose into a mould or other receptacle requiring filling. The dose is determined, at a given pressure, by the time during which the filling valve remains open. But neither the opening operation nor the closing operation of the valves are instantaneous, and the time lapses involved in these opening and closing operations are subject to fluctuations so that the dose will tend to vary slightly between different filling operations. Moreover, since the volume of the injection material container is constant, the quantity of compressed gas used in the course of an injection operation can vary quite considerably with different dose sizes, and since the volume of the container must be dimensioned for the largest dose it is likely to receive, it follows that the smaller the dose, the greater will be the dead space that has to be filled with compressed gas for an injection operation. Consequently, there is an excessive consumption of compressed gas, thereby rendering the operation of these devices costly.

The device according to the present invention overcomes these drawbacks by ensuring an accurate and regulatable charge of injection material and by enabling an economic operation through reduction to a minimum of the dead space. The device according to the invention is distinguished from known devices in that the container is provided with overflow outlet means that set a maximum filling level and with excess material collector means for receiving the material overflowing through the outlet means, and in that means are provided for modifying at will the useful content of the container so that the injection device may receive a regulatable charge of injection material. For a better understanding of the invention and to show how the same may be carried into effect, reference will now be made to the single figure, partly in section, of the accompanying drawing which illustrates one form of embodiment of the injection device according to the invention.

The illustrated injection device comprises a cylindrical container to which is secured a circular closure cover 2 by means of bolts 3, an annular gasket 17 being provided to ensure fluidtightness. The container 1 is supplied through an inlet pipe 4 from a source (not shown) with injection material which is discharged, for example into a mould (not shown), through an outlet pipe 5. Pipes 4 and 5 are provided with automatically operable valves 6 and 7, respectively. The side wall 8 of container 1 is formed with overflow outlet means which, in the illustrated embodiment, consists of two openings 9 and 9a formed in wall 8. Their bottom edges determine the maximum level, indicated by line 10, to which the container 1 can be filled.

The side wall 8 carries a cylindrical circumferential jacket 11 having an oblique bottom 12. The jacket 11 constitutes a collector 13 for material overflowing from the container 1 through the openings 9 and 9a. The side wall 8 is moreover formed with a hole 14 which enables the lowest part of the collector 13 to communicate with the interior of the container 1. The hole 14 may be closed by a valve member, for example a ball 15, mounted at the free end of a bent arm 16 of a bell-crank lever of which the other arm 17 is pivotally connected to a rod 18 actuated by an electro-magnet 19. Elastic means, for example a spring 20, are provided to urge the ball 15 in seated engagement with the hole 14 so as to keep the latter shut when the electro-magnet 19 is not energized. The electro-magnet 19 is enclosed in an outwardly fluidtight casing 21 acting as a cover for a chamber 21a provided on the outer wall of collector 13, in which chamber is housed the pivotal mounting for the bell-crank lever.

A level detector, consisting for example of a float 22 secured to one end of a stem 23 mounted for vertical sliding movement in guide means 24, is adapted to bring about the closure of the inlet pipe valve 6 as soon as the level 25 of the liquid overflowing from the container into the collector 13 reaches a predetermined point. For example, since valve 6 is an electrically operated valve that closes in the absence of current, the top end of stem 23 is arranged to actuate, when raised, a switch 26 adapted to interrupt the supply of electricity to valve 6 by opening the circuit formed by conductors 28. The switch 26 is housed in an outwardly fluidtight chamber 27 and abutments 29 are provided to limit axial displacement of the stem 23.

The cover 2 is formed with an upwardly directed cup-shaped cylindrical boss 30 in which is slidably mounted a plunger-like piston 31. A sealing ring 32 is provided to ensure fluidtightness between the container and the interior of the hollow boss 30, and a vent hole 39 is formed in the top part 34 of boss 30 to prevent the build-up of an air cushion therein. A threaded shank 33, which bears against the top part 34 of boss 30, cooperates with a nut 35 fixedly mounted in the upper part 36 of the plunger-like piston 31 to enable axial displacement thereof. Means are provided to prevent the plunger-like piston 31 from rotating about its axis. These means consist for example of a stem 37 which also acts as rectilinear guide means for the plunger-like piston 31. Moreover, drive means are provided, for example a reversible electric motor 38, which, in association with remote control means (not shown), enables the threaded shank 33 to be selectively rotated in either direction. The plunger-like piston 31 is provided with a graduated scale 42 which can be read through a transparent window 40 with reference to a mark 41 provided on the latter thereby visually to control the axial position of piston 31 and hence the useful capacity of the container 1.

The compressed gas that is required for an injection operation is supplied from an external source (not shown) to the container 1 through an inlet pipe 45 provided with an automatically controlled valve 46. Air contained in the container can be vented through an outlet pipe 47, having a valve 48, drilling a filling operation. Means are provided for ensuring simultaneous operation of the admission valve 46 and of the venting valve 48 so that when the valve 46 is open, valve 48 will be closed.

The illustrated device operates as follows:

When the container 1 is empty, with discharge valve 7, admission valve 46 and drainage hole 14 closed, with venting valve 48 open and with plunger 31 set in a predetermined position, the opening of valve 6 will cause injection material to flow into the container and gradually to reach the level 10. Excess material will overflow into the collector 13 through openings 9 and 9a. The level 25 in the collector 13 will then progressively rise to lift the float 22. When the level 25 reaches a predetermined point, the float 22 opens switch 26 thereby closing valve 6. The quantity or dose of injection material in the container 1 is thus determined by the space defined by the wall 8, the submerged surface of plunger 31 and the level 10 governed by the position of the overflow openings 9 and 9a. The dose is consequently accurately determined, independently of the time during which the valve 6 remains open and whatever time lapses are involved in opening and closing valve 6. The material discharge valve 7 is then opened together with the valve 46 which admits the compressed gas required for the injection. The dead space, which more or less equals that in collector 13, is small and since it is independent of the position of plunger 31, does not vary whatever modifications may be made in the quantity of injection material received by container 1. If this quantity is to be modified, it suffices to rotate the threaded shank 33 by means of motor 38 thereby altering the position of plunger 31, i.e. the useful volume of container 1. The window 40 affords the possibility of checking at any time the position of the plunger and thus the charge of material. When the injection operation is completed and valve 7 is closed, the electro-magnet 19 is energized to bring about the opening of valve member 15 and the emptying of the excess material in collector 13 from the previous filling operation into the container 1. This excess material thus immediately takes part in the next filling operation. The electro-magnet 19 is then de-energized to replace ball 15 in seated engagement with hole 14 and a fresh cycle can begin. The described device has several advantages over the known devices: accuracy of injection material content of the container 1; small dead space, thus resulting in operational saving; constant value of this dead space, thus resulting in constant consumption of compressed gas; no need to return under pressure the excess material back to the main injection material reservoir or source, thereby cutting out an additional consumption of compressed gas. Its automatic operation renders it particularly suitable for incorporation in an automatic injection machine.

As many possible embodiments of the invention may be made and as many possible changes may be made in the embodiments herein set forth, it will be distinctly understood that all matter described herein is to be interpreted as illustrative and not as a limitation.

I claim:

1. An injection device for measuring a predetermined quantity of liquid material and for subsequently discharging said quantity under pressure for an injection operation, said device comprising a container for receiving a predetermined quantity of liquid material into said container and having an overflow outlet, a gas inlet conduit communicating with said container for conducting gas under pressure into said container, inlet and outlet duct means including an inlet duct in communication with the interior of said container for introducing liquid material into the container and an outlet duct communicating with the interior of said container for discharging the liquid material from the container, a collector receptacle in communication with said overflow outlet from said container and having a drain outlet, and liquid flow control means, said flow control means including first valve means in said inlet duct for said inlet duct to be opened and closed, second valve means in said outlet duct for said outlet duct to be opened and closed, third valve means in said conduit for said conduit to be opened and closed, and drain outlet control and liquid level sensing means, the latter said means including liquid level sensing means associated with said collector receptacle and said first valve means for closing said first valve means after said predetermined quantity of liquid material in said container is obtained and when a predetermined level of liquid in said collector receptacle is obtained, and fourth valve means having open and closed positions relative to said drain outlet for said drain outlet to be closed respectively while said first valve means and third valve means are open and for said drain outlet to be opened after said second valve means has been opened and closed.

2. The injection device set forth in claim 1, wherein said drain outlet intercommunicates with said container and said collector receptacle.

3. The injection device set forth in claim 1, wherein said device further includes means movably connected with said container and extending inside said container for varying the effective injection material content of said container.

4. The injection device set forth in claim 1, wherein said device further includes an adjustably mounted plunger in said container for modifying the volume of said container below the level of said overflow outlet, said plunger being offset inwardly from said container to enable the liquid material freely to flow between said container and plunger to said overflow outlet.

5. The injection device set forth in claim 1, wherein said device further includes a plunger in said container and relatively movably mounted adjusting means connecting said plunger with said container for said plunger to be axially moved in said container for modifying the volume of said container below the level of said overflow outlet, and means for preventing rotation of the plunger while said plunger is being axially moved and while said plunger is in adjusted position.

6. The injection device set forth in claim 5, wherein said relatively movably engaged adjusting means includes relatively rotatable interengaging first and second components, said first component being rotatable in either of opposite directions corresponding to opposed directions of axial movement of said plunger, and said components connecting said plunger with said container for said plunger to be moved in either of said axial directions in said container, and reversible drive means drivingly connected with said first component for rotating said first component selectively in either of said opposite directions of rotation.

7. The injection device set forth in claim 6, wherein said device further includes a graduated scale on said plunger, and a viewing window and an index adjacent to said scale for said scale to be viewed from a viewing station externally of the device.

8. The injection device set forth in claim 6, wherein a lower portion of said container is connected with said inlet and outlet ducts respectively for the liquid material to be received in said container, an upper portion of said container has said overflow outlet therein for liquid material supplied through said inlet duct to overflow from said container, and said collector receptacle extends vertically downwardly from said overflow outlet for the overflow liquid material to accumulate therein by gravity discharge from said overflow outlet.

9. An injection device for measuring a predetermined quantity of liquid material and for subsequently discharging said quantity under pressure for an injection operation, said device comprising a container for receiving a predetermined quantity of liquid material into said container and having an overflow outlet, gas inlet and outlet conduit means including a gas inlet conduit communicating with said container for conducting gas under pressure into said container and a gas outlet conduit communicating with said container for gas to be vented from said container, inlet and outlet duct means including an inlet duct in communication with the interior of said container for introducing liquid material into the container and an outlet duct communicating with the interior of said container for discharging the liquid material from the container, a collector receptacle in communication with said overflow outlet from said container and having a drain outlet, and liquid flow control means, said flow control means including first valve means in said inlet duct for said inlet duct to be opened and closed, second valve means in said outlet duct for said outlet duct to be opened and closed, third valve means in said gas outlet conduit for said gas outlet conduit to be opened when said first valve means is open and closed when said first valve means is closed, fourth valve means in said gas inlet conduit for said gas inlet conduit to be opened and closed, and drain outlet control and liquid level sensing means, the latter said means including liquid level sensing means associated with said collector receptacle and said first valve means for closing said first valve means after said predetermined quantity of liquid material in said container is obtained and when a predetermined level of liquid in said collector receptacle is obtained, and fifth valve means having open and closed positions relative to said drain outlet for said drain outlet to be closed respectively while said first valve means and said fourth valve means are open and for said drain outlet to be opened after said second valve means has been opened and closed.

References Cited by the Examiner

UNITED STATES PATENTS

| | | | |
|---|---|---|---|
| 629,577 | 7/99 | Luhn | 103—248 |
| 826,195 | 7/06 | Schwaninger | 103—248 |
| 1,750,872 | 3/30 | Bremer | 222—440 |
| 1,750,979 | 3/30 | Webb | 222—440 |

FOREIGN PATENTS

| | | |
|---|---|---|
| 605,565 | 2/26 | France. |
| 818,909 | 6/37 | France. |

LAURENCE V. EFNER, *Primary Examiner.*